United States Patent [19]

Bloom et al.

[11] 4,172,184

[45] Oct. 23, 1979

[54] LAMINAR BATTERIES

[75] Inventors: Stanley M. Bloom, Waban; Arnold Hoffman, Brookline; Kenneth S. Norland, Belmont, all of Mass.

[73] Assignee: Polaroid Corporation, Cambridge, Mass.

[21] Appl. No.: 939,847

[22] Filed: Sep. 5, 1978

[51] Int. Cl.[2] .............................................. H01M 6/12
[52] U.S. Cl. .................................... 429/162; 429/222; 204/2.1
[58] Field of Search ........................ 429/222, 245, 162; 204/50 R, 292, 2.1; 427/123

[56] References Cited

U.S. PATENT DOCUMENTS

| 3,309,228 | 3/1967 | Dodson | 429/222 X |
|---|---|---|---|
| 3,326,721 | 6/1967 | Henderson et al. | 204/50 R X |
| 3,785,867 | 1/1974 | Edwards et al. | 429/222 X |
| 3,847,784 | 11/1974 | Przybyla | 429/222 X |
| 4,007,472 | 2/1977 | Land | 429/162 X |

*Primary Examiner*—Charles F. LeFevour
*Attorney, Agent, or Firm*—John W. Ericson

[57] ABSTRACT

A stable high capacity battery employs a lead foil having cadmium plated on at least one side thereof to a thickness of about 0.1 to 3 mils as the anode.

15 Claims, No Drawings

LAMINAR BATTERIES

BACKGROUND OF THE INVENTION

This invention relates to electrical power supplies and more particularly to laminar cells and batteries.

U.S. Pat. Nos. 3,705,543; 3,543,662; 3,543,663 and 3,595,661 relate to photographic film packs comprising an enclosure containing self-developing film units integrated with a battery comprising the power supply for a camera adapted to expose and process the film units. Such film packs are presently employed in automatic cameras such as that sold by Polaroid Corporation of Cambridge, Mass., U.S.A. under the trademark SX-70.

Batteries suited for use in systems such as that just described are required to supply high current drains with low internal impedance. These requirements have led to the use of thin, flat laminar batteries. A particular battery long used for this purpose uses zinc anodes, cathodes of manganese dioxide and carbon, and an aqueous zinc chloride-ammonium chloride electrolyte.

In an effort to provide improved batteries, investigations have been made into electrochemical cells other than the zinc anode/manganese dioxide cathode system referred to above. One such system involves a cadmium anode with a suitable cathode such as manganese dioxide. See, e.g., U.S. Pat. Nos. 3,494,796 and 3,775,273. These systems are reputed to have a satisfactory storage stability. However, attempts to fabricate the cadmium anode in a suitably thin form generated problems.

The prior art has heretofore formulated electrodes by electroplating cadmium onto various metal foils. See, e.g., U.S. Pat. Nos. 3,326,721, 3,783,025 and 3,837,919. The dimension requirements of the present batteries, however, are such that the cadmium cannot be plated on an iron or zinc foil without the formation of a substantial number of pinholes. Minor leaks of electrolyte through the cadmium plate and into contact with the iron or zinc foil result, and since the iron or zinc is electrochemically active in the cell environment, corrosion problems arise and the requisite storage stability cannot be achieved.

It has now been found that if the foil is a lead foil, a very thin cadmium plate can be deposited without any substantial number of pinholes and, further, since the lead is electrochemically inactive in the cell environment, minor leakage of the electrolyte through the cadmium plate can be tolerated. As a result, battery cells and batteries can be fabricated having excellent storage stability.

Accordingly, it is the object of this invention to provide a new anode construction which can be used in battery cells and batteries meeting all of the foregoing electrical requirements and having a long storage stability period. This and other objects of the invention will become apparent to those skilled in the art from the following detailed disclosure.

SUMMARY OF THE INVENTION

The present invention is concerned with a primary battery anode and to electrical cells and batteries utilizing the anode. The requisite thinness and compactness for photographic utilization is retained, satisfactory current drain capacities and recovery rates are present, and the desired long term storage stability is achieved. As a consequence, it is advantageously suited for powering advanced photographic systems incorporating automatic shutters, film advance motors and the like.

The improved performance of the instant battery is achieved utilizing components suited to high volume, low unit cost manufacturing techniques and, consequently, the important aspect of disposability of the power supply-film system at the exhaustion of the film supply unit of an associated cassette or container is maintained. Additionally, if desired, the anode and battery of the present invention can be formulated in cylindrical cells like the conventional "D" cells, or made in cylindrical form by rolling up a thin, flat structure.

The anode of the present invention is characterized by being a lead foil which is plated on one or both sides with a thin cadmium layer. Battery cells constructed in accordance with the present invention include such an anode in conjunction with a suitable cathode and electrolyte and batteries comprise a plurality of such cells electrically interconnected in series or in parallel, as desired.

DESCRIPTION OF THE INVENTION

The anode of the present invention is a lead foil which has been plated on one or both sides with a thin cadmium layer. It is necessary that the foil be a lead foil since the use of other materials results in the excessive formation of pinholes when cadmium is electrodeposited to the thicknesses contemplated by this invention. The thickness of the lead foil is generally within the range of about 3 to 10 mils and it is usually preferable to keep the lead foil as thin as feasible, preferably about 3 to 5 mils.

The lead foil is electroplated to provide an electroconductive cadmium plate thereon. The electroplating can be performed by procedures well known in the art such as, for example, by employing the foil as an electrode in a cadmium containing electrolyte and passing a suitable amount of current to deposit the cadmium on the foil. The electroplating is controlled such that the thickness of the cadmium deposited is very thin, generally in the range of about 0.1 to 3 mils and preferably about 0.3 to 1 mils.

The anode structure of the present invention can be formulated into a battery cell by combination with a suitable electrolyte and a cathode in a wide variety of arrangements as is known in the art. For example, the cathode can be of the dry patch variety such as described, for instance, in U.S. Pat. No. 3,770,504, a hybrid type cathode such as described in U.S. Pat. No. 4,007,472 or a slurry type. A dry patch cathode can be prepared, for instance, by depositing via printing, silk screening or the like as a patch on a current collector assembly a solvent or aqueous mixture of particulate carbon, manganese dioxide and a binding agent followed by the heat induced vaporization of the solvent or aqueous phase to provide a particulate cathode mix dispersion within a binder bonded to the surface of the collector. A slurry cathode is a slurry of a particulate cathode active material in an aqueous electrolyte. The hybrid cathode comprises a cathode slurry layer deposited on a dry patch cathode layer.

The use of the slurry cathode in a planar battery is disclosed in U.S. Pat. No. 3,953,242, which teaches a manganese dioxide-carbon slurry cathode in combination with a powered zinc anode of the conventional dry patch type.

It is generally preferable to separate the cathode or cathode slurry from the anode by the use of a suitably dimensioned sheet of battery separator material. This material is selected so as to be wettable by the slurry depositions with which it is in contact as well as being ionically permeable. Among the materials conventionally used as separators are those made of fibers and cellulosic materials, woven or nonwoven fibrous materials such as polyester, nylon, polypropylene, polyethylene and glass. Kraft paper having thickness of about 2 mils has been found adequate for the purposes of the present invention.

Deposited over the anode is the electrolyte. The electrolyte will ordinarily comprise an aqueous solution of an electrodissociable salt together with a gelling agent such as hydroxyethylcellulose. The electrolyte may be deposited utilizing conventional positive displacement techniques, doctoring, silk screening or the like. Any of the conventional electrodissociable salts heretofore known can be used in the electrolyte. In a preferred embodiment of the present invention, the salt is cadmium chloride.

In order to further illustrate the present invention, various examples are given hereinafter. It should be appreciated that unless otherwise specified, all parts and percentages are by weight and all temperatures are in degrees Centigrade throughout this discription and the appended claims.

EXAMPLE 1

A 5 cell battery was prepared in which each cell contained the anode of the present invention and a slurry cathode. The anode was a 5 mil thick lead foil which had 0.3 mil thick cadmium electroplated on one side only. Deposited on the cadmium was a gelled aqueous electrolyte containing 9.8% cadmium chloride, 19.6% ammonium chloride, 68.6% water, and 2% of hydroxyethyl cellulose. The gelled electrolyte was separated from the cathode slurry by a 2 mil thick Kraft paper and the cathode slurry was prepared by mixing 33 grams of ammonium chloride, 15 grams of cadmium chloride, 60 grams of an aqueous solution of poly(2-acrylamido-2-methylpropane sulfonic acid) containing 10 percent of polymer by weight based on the weight of solution, 200 grams of manganese dioxide, 25 grams of carbon black and 40 grams of water. The slurry cathode had been deposited on a steel plate current collector. The Kraft paper separators were sealed around the edges to adjacent components with a Versamide type polyamide hot melt adhesive.

The five cell battery was utilized to operate a Polaroid SX-70 camera that had been modified to accept an external battery supply. It was determined that 20 SX-70 film packs could be operated over a period of one hour allowing five to thirty seconds between pictures in each film pack.

EXAMPLE 2

A five cell battery was prepared as described in Example 1 except that a manganese dioxide/carbon dry patch cathode was interposed between the slurry cathode and the steel current collector, thereby forming a hybrid type cathode as described in the aforementioned U.S. Pat. No. 4,007,472. The five cell battery was stored for 14 days at 120° F. and then tested as described in Example 1. It was found that 20 SX-70 film packs could be operated over a 2 hour period and, after resting the battery for 12 hours, an additional 3 SX-70 film packs could be operated.

In both examples 1 and 2, the open circuit voltage before pulse down of the five cell batteries was 6.4–6.6. In all cases, the open circuit voltage was greater than five volts during pulse down and the lowest open circuit voltages observed were 5.1–5.2 at the end of use.

EXAMPLE 3

Fifty single cells were formulated as described in Example 2 except that the anode was a 5 mil thick lead foil plated on both sides with 1 mil thick cadmium. The initial open circuit voltage (OCV) and closed circuit voltage (CCV) with a 1.1 ohm load were determined and then the cells were stored for 6.5 months under ambient conditions. The OCV and CCV were then redetermined. The results, demonstrating that the cells are storage stable, are set forth in Table 1 below:

| Cell No. | Initial | | 6.5 Month | |
|---|---|---|---|---|
| | OCV | CCV | OCV | CCV |
| 1 | 1.40 | 1.27 | 1.38 | 1.27 |
| 2 | 1.40 | 1.26 | 1.39 | 1.25 |
| 3 | 1.40 | 1.25 | 1.39 | 1.25 |
| 4 | 1.38 | 1.28 | 1.37 | 1.29 |
| 5 | 1.40 | 1.26 | 1.38 | 1.28 |
| 6 | 1.38 | 1.27 | 1.38 | 1.29 |
| 7 | 1.39 | 1.26 | 1.36 | 1.25 |
| 8 | 1.39 | 1.27 | 1.38 | 1.29 |
| 9 | 1.39 | 1.23 | 1.37 | 1.23 |
| 10 | 1.40 | 1.27 | 1.39 | 1.26 |
| 11 | 1.41 | 1.26 | 1.39 | 1.27 |
| 12 | 1.41 | 1.28 | 1.39 | 1.27 |
| 13 | 1.40 | 1.26 | 1.39 | 1.26 |
| 14 | 1.38 | 1.27 | 1.37 | 1.26 |
| 15 | 1.40 | 1.28 | 1.39 | 1.28 |
| 16 | 1.40 | 1.25 | 1.39 | 1.26 |
| 17 | 1.38 | 1.27 | 1.36 | 1.25 |
| 18 | 1.39 | 1.24 | 1.38 | 1.22 |
| 19 | 1.39 | 1.24 | 1.38 | 1.25 |
| 20 | 1.41 | 1.27 | 1.39 | 1.27 |
| 21 | 1.38 | 1.26 | 1.36 | 1.27 |
| 22 | 1.39 | 1.27 | 1.38 | 1.28 |
| 23 | 1.39 | 1.27 | 1.38 | 1.25 |
| 24 | 1.40 | 1.27 | 1.39 | 1.27 |
| 25 | 1.38 | 1.27 | 1.38 | 1.27 |
| 26 | 1.40 | 1.27 | 1.38 | 1.26 |
| 27 | 1.39 | 1.26 | 1.39 | 1.27 |
| 28 | 1.39 | 1.25 | 1.37 | 1.24 |
| 29 | 1.39 | 1.26 | 1.38 | 1.27 |
| 30 | 1.41 | 1.26 | 1.40 | 1.28 |
| 31 | 1.40 | 1.25 | 1.37 | 1.24 |
| 32 | 1.40 | 1.24 | 1.38 | 1.27 |
| 33 | 1.37 | 1.26 | 1.37 | 1.27 |
| 34 | 1.39 | 1.24 | 1.38 | 1.23 |
| 35 | 1.39 | 1.26 | 1.39 | 1.27 |
| 36 | 1.38 | 1.25 | 1.38 | 1.25 |
| 37 | 1.38 | 1.24 | 1.36 | 1.25 |
| 38 | 1.39 | 1.26 | 1.38 | 1.27 |
| 39 | 1.38 | 1.25 | 1.37 | 1.25 |
| 40 | 1.38 | 1.26 | 1.36 | 1.25 |
| 41 | 1.39 | 1.27 | 1.38 | 1.27 |
| 42 | 1.38 | 1.26 | 1.38 | 1.26 |
| 43 | 1.40 | 1.26 | 1.39 | 1.26 |
| 44 | 1.38 | 1.27 | 1.38 | 1.27 |
| 45 | 1.40 | 1.27 | 1.39 | 1.27 |
| 46 | 1.39 | 1.25 | 1.39 | 1.27 |
| 47 | 1.38 | 1.26 | 1.37 | 1.27 |
| 48 | 1.39 | 1.24 | 1.36 | 1.23 |
| 49 | 1.40 | 1.24 | 1.39 | 1.24 |
| 50 | 1.39 | 1.25 | 1.38 | 1.26 |

EXAMPLE 4

Example 3 was repeated except that the slurry cathode layer was eliminated thereby employing only a dry patch cathode and the time of storage was 8½ months. The results are shown in Table 2 below:

| Cell No. | Initial OCV | Initial CCV | 8½ Month OCV | 8½ Month CCV |
|---|---|---|---|---|
| 1 | 1.36 | 1.72 | 1.31 | 1.03 |
| 2 | 1.37 | 1.06 | 1.32 | .93 |
| 3 | 1.35 | 1.15 | 1.31 | 1.04 |
| 4 | 1.39 | 1.12 | 1.31 | 1.04 |
| 5 | 1.36 | 1.17 | 1.31 | 1.16 |
| 6 | 1.37 | 1.17 | 1.32 | 1.06 |
| 7 | 1.37 | 1.17 | 1.32 | 1.10 |
| 8 | 1.36 | 1.16 | 1.31 | 1.11 |
| 9 | 1.36 | 1.12 | 1.32 | 1.03 |
| 10 | 1.37 | 1.12 | 1.33 | 1.02 |
| 11 | 1.36 | 1.15 | 1.32 | 1.10 |
| 12 | 1.36 | 1.10 | 1.31 | 1.08 |
| 13 | 1.36 | 1.13 | 1.31 | 1.11 |
| 14 | 1.34 | 1.37 | 1.31 | 1.11 |
| 15 | 1.35 | 1.10 | 1.33 | 1.04 |
| 16 | 1.35 | 1.07 | 1.32 | .97 |
| 17 | 1.35 | 1.07 | 1.32 | 1.01 |
| 18 | 1.36 | 1.14 | 1.32 | 1.03 |
| 19 | 1.36 | 1.13 | 1.32 | 1.01 |
| 20 | 1.37 | 1.15 | 1.32 | 1.04 |
| 21 | 1.36 | 1.10 | 1.32 | 1.00 |
| 22 | 1.36 | 1.18 | 1.31 | 1.11 |
| 23 | 1.37 | 1.17 | 1.32 | 1.06 |
| 24 | 1.37 | 1.18 | 1.32 | 1.08 |
| 25 | 1.36 | 1.17 | 1.31 | 1.04 |
| 26 | 1.36 | 1.22 | 1.31 | 1.10 |
| 27 | 1.35 | 1.20 | 1.31 | 1.14 |
| 28 | 1.35 | 1.17 | 1.32 | 1.04 |
| 29 | 1.36 | 1.16 | 1.32 | 1.02 |
| 30 | 1.36 | 1.15 | 1.32 | 1.05 |
| 31 | 1.36 | 1.15 | 1.31 | 1.05 |
| 32 | 1.36 | 1.17 | 1.31 | 1.11 |
| 33 | 1.36 | 1.15 | 1.32 | 1.00 |
| 34 | 1.36 | 1.15 | 1.32 | 1.02 |
| 35 | 1.36 | 1.21 | 1.31 | 1.11 |
| 36 | 1.36 | 1.16 | 1.31 | 1.05 |
| 37 | 1.35 | 1.17 | 1.31 | 1.11 |
| 38 | 1.36 | 1.16 | 1.31 | 1.08 |
| 39 | 1.36 | 1.16 | 1.31 | 1.08 |
| 40 | 1.37 | 1.16 | 1.31 | 1.08 |
| 41 | 1.36 | 1.13 | 1.32 | 1.07 |
| 42 | 1.36 | 1.15 | 1.31 | 1.11 |
| 43 | 1.37 | 1.15 | 1.32 | 1.09 |
| 44 | 1.38 | 1.10 | 1.33 | 1.04 |
| 45 | 1.36 | 1.14 | 1.31 | 1.11 |
| 46 | 1.37 | 1.12 | 1.32 | .95 |
| 47 | 1.37 | 1.21 | 1.32 | 1.08 |
| 48 | 1.37 | 1.22 | 1.32 | 1.10 |
| 49 | 1.36 | 1.15 | 1.31 | 1.06 |
| 50 | 1.36 | 1.17 | 1.32 | 1.08 |

EXAMPLE 5

A battery cell was constructed using, as the anode, a 7 mil thick lead foil plated on both sides with 0.8 mil thick cadmium. On one of the cadmium layers, a gelled electrolyte containing aqueous cadmium chloride and methylcellulose as the gelling agent was placed. A Kraft paper separator was placed on the gelled electrolyte and sealed around the edges to adjacent components with a Versamide type polyamide hot melt adhesive. On the other side of the separator was a gelled aqueous cathode slurry containing manganese dioxide, carbon and cadmium chloride. This cathode had been deposited on a 2 mil sheet of Condulon conductive plastic, a vinyl which is filled with carbon black. The other side of the conductive plastic was bonded to a steel terminal sheet.

The above description has been directed primarily towards the special applicability of the novel battery of this invention to photographic applications employing the battery in a film cassette as the power source for operating a camera to expose and process the film units in the cassette. It will be understood that this battery also is useful in other applications, e.g., to power a camera using film cassettes which individually do not include a battery, a plurality of film cassettes being processed using a single battery or to power any other electrically operated appliance or device, such as a flashlight, game, toy, radio or calculator or the like.

Since certain changes may be made in the above product without departing from the scope of the invention herein involved, it is intended that all matter contained in the above description shall be interpreted as illustrative and not in a limiting sense.

What is claimed is:

1. A thin, substantially pinhole free cadmium battery anode comprising a lead foil having cadmium plated on at least one side thereof to a thickness of about 0.1 to 3 mils.

2. The electrode of claim 1 wherein said foil has a thickness of 0.3 to 1 mils.

3. The foil of claim 2 wherein said foil has a thickness of 3.0–10 mils and said cadmium has a thickness of 0.1–3 mils.

4. The electrode of claim 1 wherein said cadmium is plated on both sides of the lead foil, each cadmium layer having said thickness.

5. A primary battery cell comprising the anode of claim 1, a cathode and an electrolyte.

6. The battery cell of claim 5 wherein said cathode is a dry patch cathode.

7. The battery cell of claim 5 wherein said cathode is a planar cathode current carrying on one surface thereof in order, a first cathode stratum and a second cathode stratum, said first cathode stratum being of the dry patch cathode type and comprising a particular dispersion of cathode active particles in a binder matrix, said binder matrix being insoluble in and permeable to an aqueous electrolyte and bonded to said cathode collector, said second cathode stratum being substantially coextensive with said first cathode stratum and comprising a slurry of said cathode active particles dispersed and comprising a slurry of said cathode active particles dispersed in an aqueous electrolyte and adhered to said first cathode stratum.

8. The battery cell of claim 7 having a planar electrolyte ion permeable separator positioned between said anode and said cathode.

9. The battery cell of claim 5 wherein said electrolyte comprises cadmium chloride.

10. A battery comprising a plurality of the battery cells of claim 5 electrically interconnected.

11. A flat laminar battery in accordance with claim 10.

12. The flat laminar battery of claim 11 having a planar electrolyte ion permeable separator positioned between the anode and the cathode of each cell.

13. A laminar electrical cell comprising a cadmium anode consisting of lead foil plated on at least one side with cadmium, a cathode comprising a slurry of manganese dioxide and carbon in an aqueous electrolyte, and an electrolyte permeable separator between a cadmium plated surface of said foil confronting said separator and said slurry cathode.

14. The cell of claim 13, in which said aqueous electrolyte comprises cadmium chloride in water.

15. The cell of claim 13, in which said aqueous electrolyte comprises ammonium chloride and cadmium chloride.

* * * * *